(12) United States Patent
Yaw

(10) Patent No.: US 6,805,824 B2
(45) Date of Patent: Oct. 19, 2004

(54) PROCESS FOR MANUFACTURING A POROUS DRAINAGE MEDIUM

(76) Inventor: Larry Yaw, No. 10, Lane 7, Fu-Chung, Shih-Liu St., Hsi-Tun Dist., Taichung City (TW)

( * ) Notice: Subject to any disclaimer, the term of this patent is extended or adjusted under 35 U.S.C. 154(b) by 279 days.

(21) Appl. No.: 10/107,986

(22) Filed: Mar. 27, 2002

(65) Prior Publication Data

US 2003/0186007 A1 Oct. 2, 2003

(51) Int. Cl.[7] ............................................. B29C 67/20
(52) U.S. Cl. ................... 264/167; 264/103; 264/209.3; 264/209.4; 264/563; 264/566
(58) Field of Search ................................ 264/103, 167, 264/176.1, 177.17, 178 R, 209.1, 209.3, 562, 563, 564, 566, DIG. 4, 209.4

(56) References Cited

U.S. PATENT DOCUMENTS

| | | | | |
|---|---|---|---|---|
| 4,449,910 A | * | 5/1984 | Leloux | 425/325 |
| 4,553,923 A | * | 11/1985 | Lupke | 425/393 |
| 4,577,998 A | * | 3/1986 | Dorrn | 405/45 |
| 4,958,770 A | * | 9/1990 | Mitchell | 239/145 |
| 5,334,336 A | * | 8/1994 | Franz et al. | 264/45.3 |
| 5,366,365 A | * | 11/1994 | Sullivan, et al. | 425/144 |
| 5,417,997 A | * | 5/1995 | Creed | 264/563 |
| 5,462,092 A | * | 10/1995 | Franz et al. | 138/177 |
| 5,811,038 A | * | 9/1998 | Mitchell | 264/40.7 |

\* cited by examiner

*Primary Examiner*—Melvin C. Mayes
(74) *Attorney, Agent, or Firm*—Frommer Lawrence & Haug LLP; Ronald R. Santucci

(57) ABSTRACT

In a process for making a porous drainage medium composed of entangled strands of thermoplastic resin, subsequent to forming a tubular preform, the preform is formed with necked-down sections at intervals along the length thereof before proceeding to a cooling tank. As such, the drainage medium can be flexed in the cooling tank and can be discharged continuously and conveniently out of the cooling tank without being cut.

3 Claims, 7 Drawing Sheets

US 6,805,824 B2

PROCESS FOR MANUFACTURING A POROUS DRAINAGE MEDIUM

BACKGROUND OF THE INVENTION

1. Field of the Invention

The present invention relates to a process for manufacturing an extruded drainage medium, more particularly to the manufacture of a multi-sectional subsoil porous drainage pipe for applications in the field of civil engineering.

2. Description of the Related Art

As shown in FIG. 1, a conventional porous drainage pipe is fabricated from thermoplastic resin by extruding molten resin material to form a plurality of strands 2 that travel downwardly after exiting the extruder 1. The strands 2 are led to a forming apparatus 3 for making a tubular preform 201. While passing through the forming apparatus 3, the strands 2 are in a plasticised or softened condition and are blown by a fluid of high velocity, so that the strands 2 will be entangled to form a matrix with sufficient structural strength and possessing water permeability after setting. The tubular matrix exiting the forming apparatus 3 will travel through a roll unit 4 to smoothen the outer diameter thereof, and will subsequently enter into a cooling tank (not shown) located below the roll unit 4.

Several disadvantages may be encountered in the above-described process for fabricating the porous drainage pipe. Particularly, when the preform 201 emerges from the tip rolls of the roll unit 4 and enters into the cooling tank, it becomes inflexible due to a sudden drop of temperature and forms a rigid pipe. Thus, the cooling tank must have a depth sufficient to receive a certain length of rigid pipe before cutting. Moreover, since the depth of the cooling tank is limited, the pipe has to be cut off after extending downward to a predetermined length.

SUMMARY OF THE INVENTION

An object of this invention is to provide a process for fabricating a subsoil porous drainage medium which is capable of being delivered easily from a cooling tank.

Another object of this invention is to provide a flexible, multi-sectional porous drainage medium consisting of a plurality of links connected by flexible necked-down sections which can be cut into pieces with a desired number of the links.

According to the present invention, there is provided a process for making a porous drainage medium. The process includes the steps of: extruding a molten thermoplastic resin material to form a plurality of strands; blowing the strands in a plasticised condition using a high-velocity fluid to entangle the strands while passing the strands through a forming device, so as to result in a preform consisting of entangled strands; pinching the preform to form necked-down sections at intervals along the length of the preform, thus providing a plurality of links interconnected by the necked-down sections; and cooling the preform having the necked-down sections to form the porous drainage medium.

BRIEF DESCRIPTION OF THE DRAWINGS

The above and other objects, features and advantages of the invention will become clear from the following description of the preferred embodiment with reference to the accompanying drawings.

DETAILED DESCRIPTION OF THE PREFERRED EMBODIMENT

As stated hereinbefore, in the aforesaid conventional process for manufacturing drainage pipes, the melt blown preform directly travels to the cooling tank and becomes rigid therein. Therefore, the depth of the cooling tank is an important consideration associated with the movement of the preform.

Figure 1:
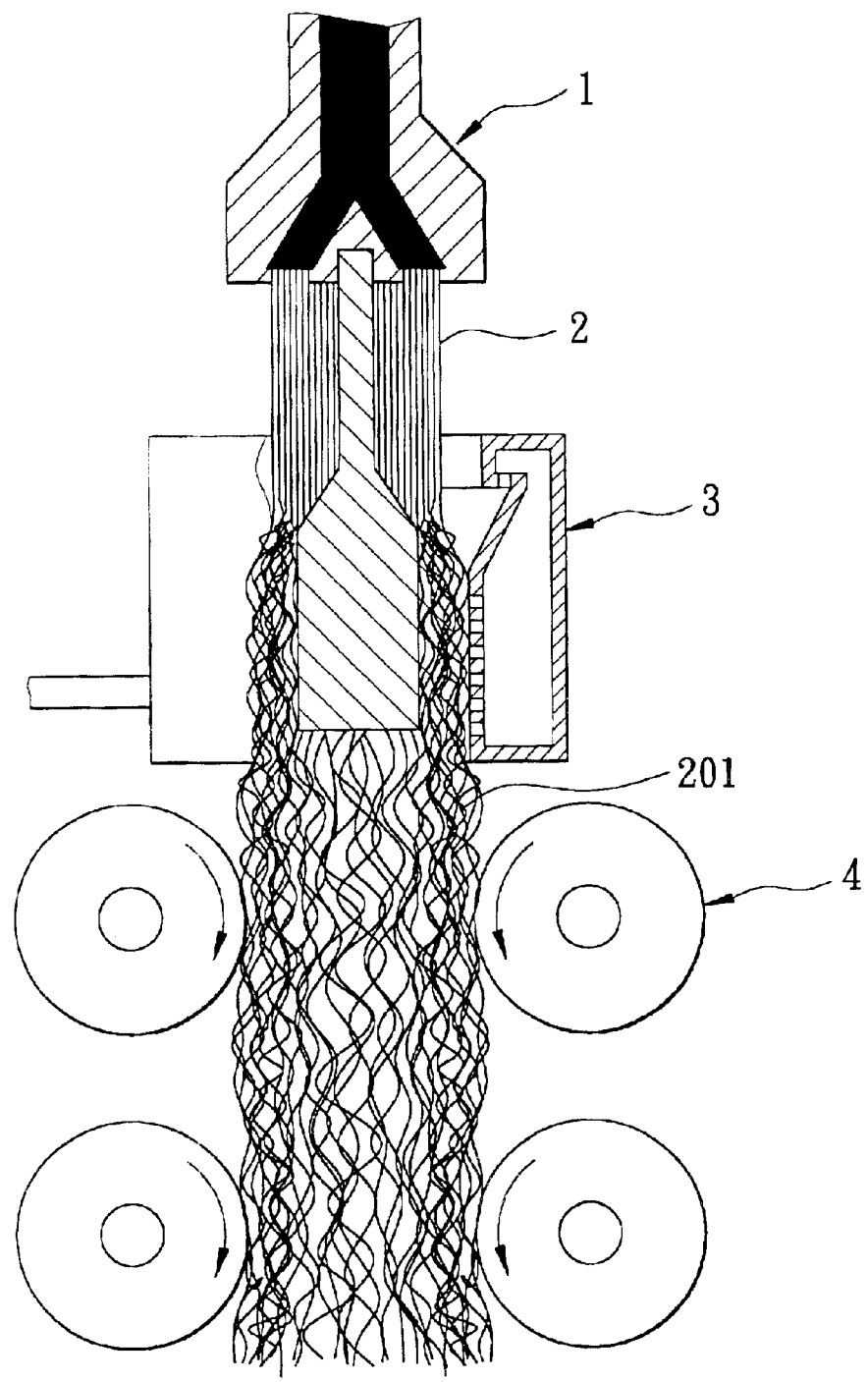
FIG. 1 is a fragmentary schematic partly sectional view illustrating a conventional process for the manufacture of a porous drainage pipe.
Figure 2:
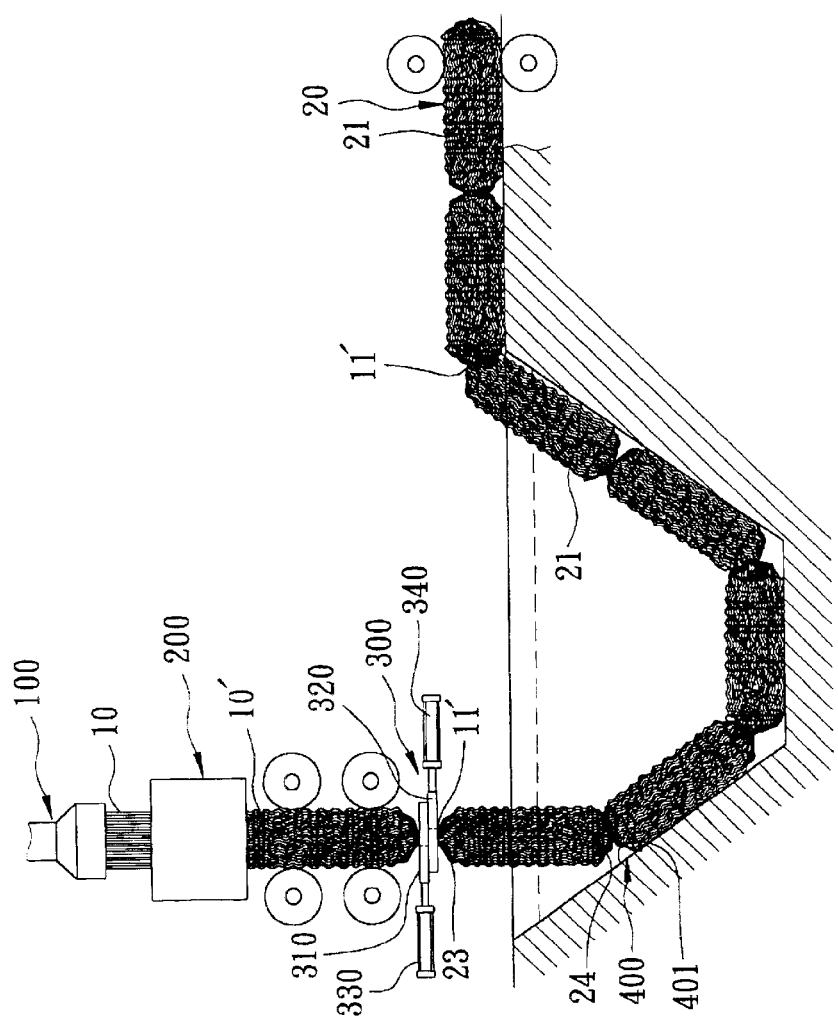
FIG. 2 is a schematic view showing the preferred embodiment of a process for manufacturing a drainage medium according to the present invention.

As shown in FIG. 2, the setup of this invention includes an extruder 100, a forming apparatus 200 and a pinch device 300.

The early stages of the process according to this invention are similar to those of the prior art described hereinbefore. When the strands 10 exit the extruder 100, they proceed to the forming apparatus 200 in a plasticized or softened condition. While passing through the forming apparatus 200, the strands 10 are blown by a high-velocity fluid to result in a tubular preform 10' constituted by a matrix of entangled strands 10.

Unlike the previously described prior art, after the preform 10' exits the forming apparatus 200, the preform 10' travels through the pinch device 300 where it is pinched at intervals and is formed with necked-down sections 11' along the length of the preform 10'. The diameter of the preform 10' is thus reduced at the sections 11' to such a degree to make the preform 10' flexible at the necked-down sections 11' after cooling and setting.

Figure 3:
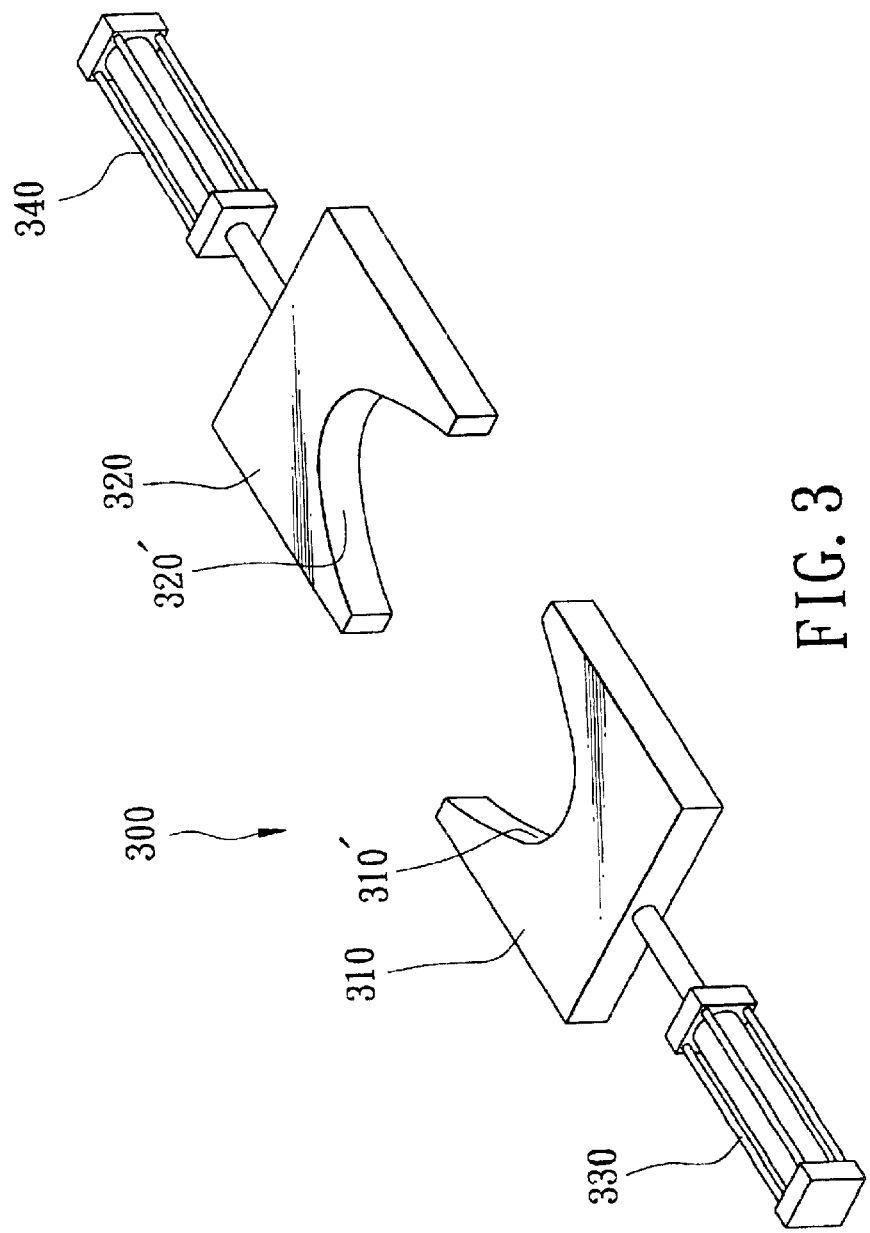
FIG. 3 is a perspective view showing a pinch device for forming necked-down sections on a tubular perform according to the present invention.
Figure 4:
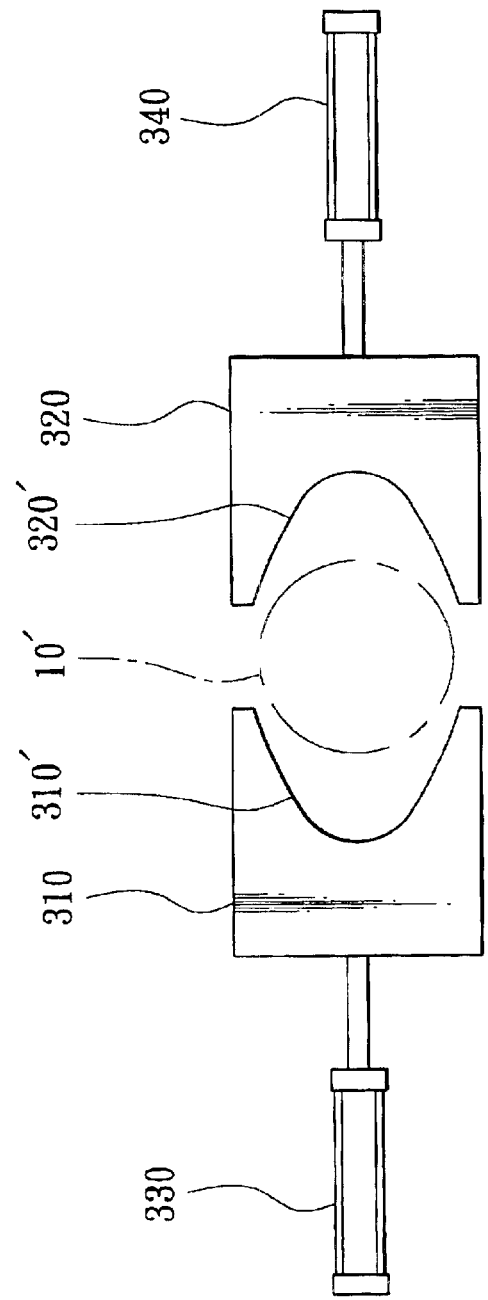
FIG. 4 is a plan view showing the pinch device in an opened position with the preform disposed between a pair of die members.
Figure 5:
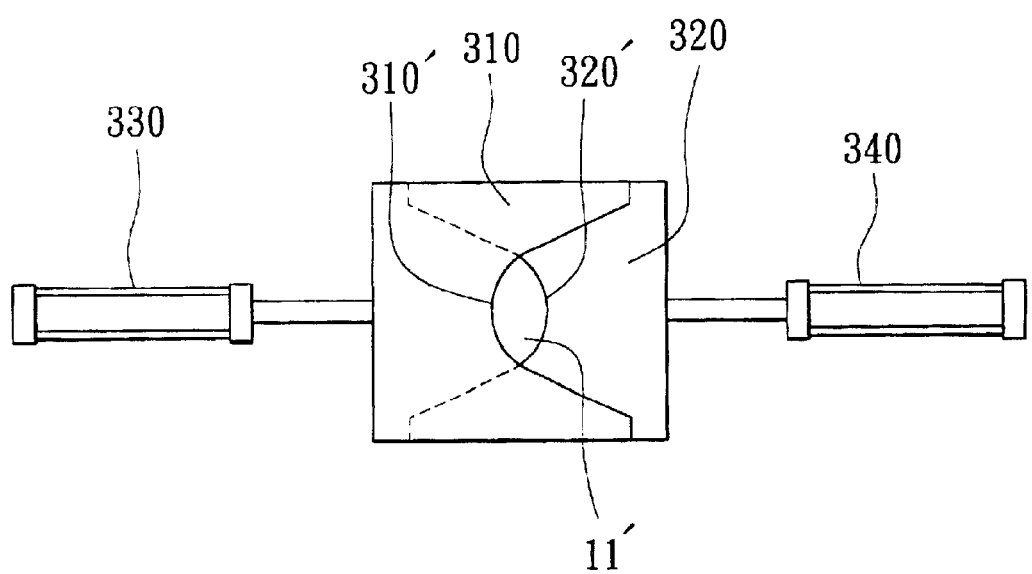
FIG. 5 is a plan view similar to FIG. 4 but showing the die members in a closed position.

Referring to FIG. 3, the pinch device 300 comprises a pair of movable die members 310, 320, each including a driving rod 330, 340. The opposing front edges of the die members 310, 320 are arcuately contoured to act as pinching faces 310', 320'. During each stroke of the pinch device 300, the movable die members 310, 320 reciprocate to move toward and away from each other between an open position shown in FIG. 4 and a closed position shown in FIG. 5. In the open position, the pinching faces 310',320' are spaced apart from each other with a gap wider than the diameter of the preform 10', while in the closed position, the die members 310, 320 overlap each other at the opposing edges thereof. In this way, reciprocation of the die members 310, 320 squeezes the softened wall of the tubular preform 10' and forms one necked-down section 11' during each stroke. The continuous tubular preform 10' is thus formed into a multi-sectional drainage medium or drainage pipe 20 which looks like sausage in appearance, with oblong units or tubular links 21 interconnected by the necked-down sections 11'. The multi-sectional drainage pipe 20 with the successive links 21 is flexible due to the necked-down sections 11', and can be flexed to change its direction of movement in a cooling tank 400.

Each individual tubular link 21 of the drainage pipe 20 has a first tapered end 23 and a second tapered end 24 opposite thereto. The contiguous ends of two tubular links 21 are connected by a necked-down section 11' resulted from the pinching force exerted by the die members 310, 320.

Referring back to FIG. 2, after exiting the pinch device 300, a first tubular link 21 of the drainage pipe 20 proceeds downwardly into the cooling tank 400 located directly below the pinch device 300. The cooling tank 400 has an inclined side wall 401 in this embodiment, and the vertical distance between the pinch device 300 and the inclined side wall 401 of the cooling tank 400 is slightly longer than the length of each tubular link 21. Therefore, as soon as a second tubular link 21 succeeding the first link 21 emerges from the pinch device 300, the first tubular link 21 will turn to lie against the side wall surface of the cooling tank 400 upon contact. Therefore, dimensional constraints of the cooling tank 400 will be lifted.

The preform 10' discharged from the cooling tank 400 can be either wound into a coil, or cut at the necked-down sections 11' into individual links 21.

Figure 6:
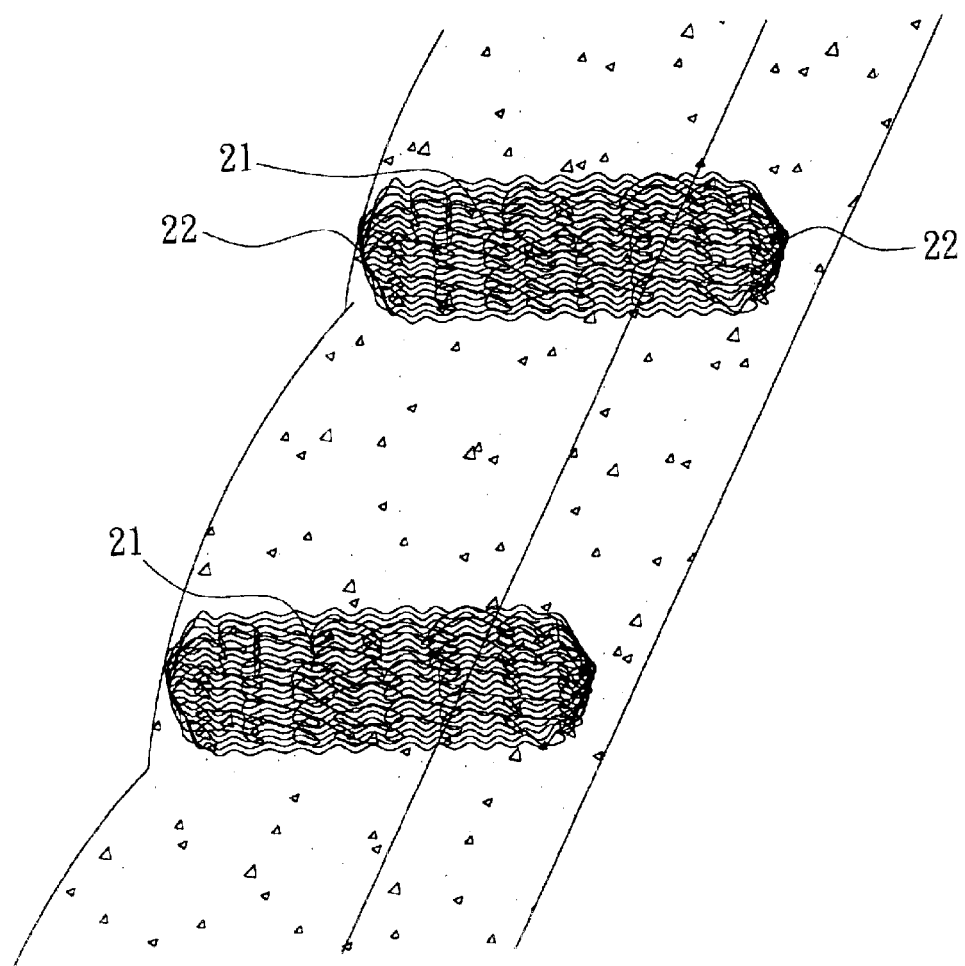
FIG. 6 is a schematic view showing an application of individual links of the drainage medium manufactured by the process of the present invention.

FIG. 6 illustrates an application of the drainage pipe 20 made according to the present invention. The tubular links 21 of the drainage pipe 20 are buried in the land of mountain slope in parallel, with one end extending into the water-bearing stratum and the other end located nearby the land surface. Thus, water can be drained to the land surface through the tubular links 21 made of water permeable matrix.

Figure 7:
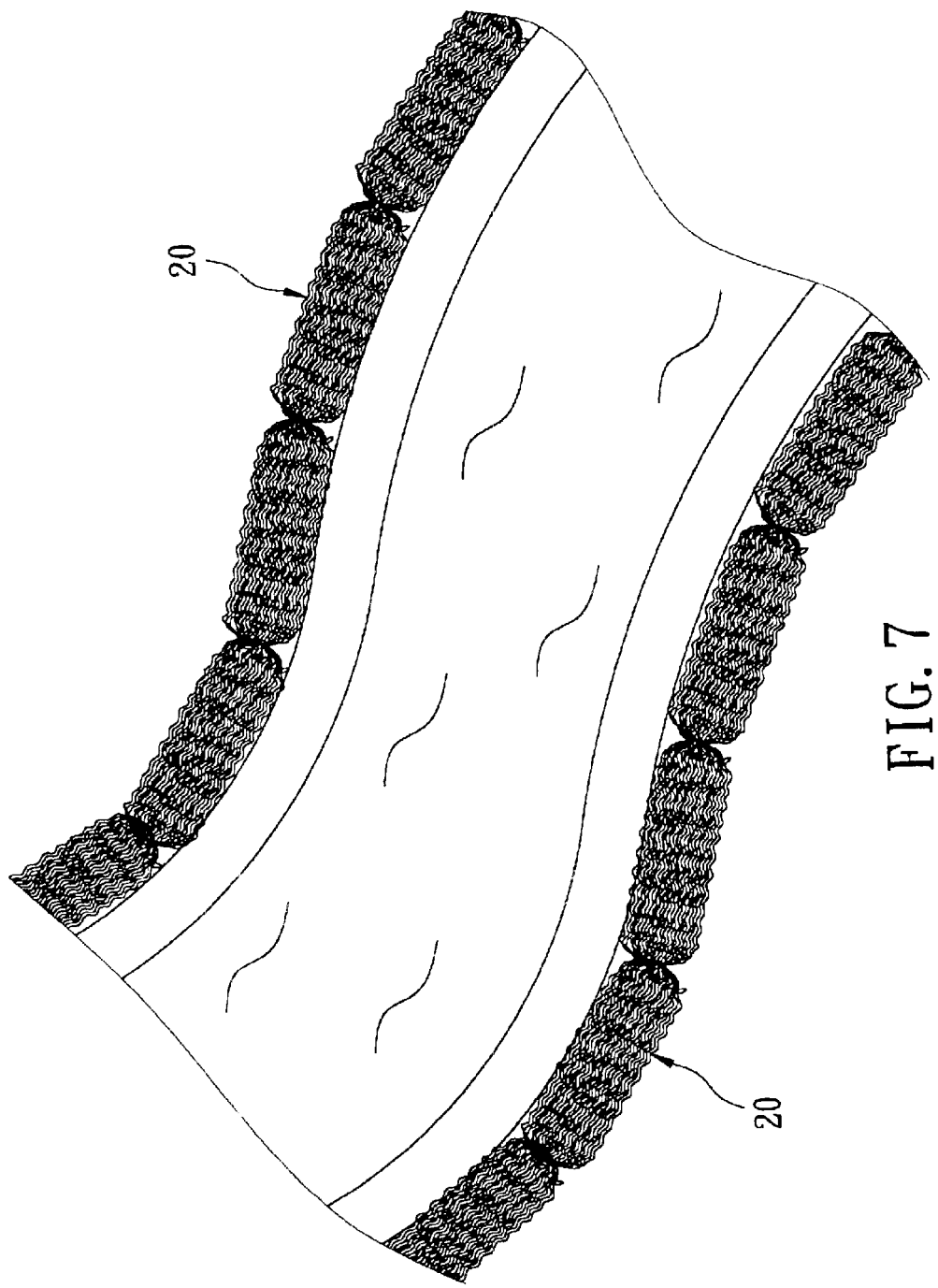
FIG. 7 is a schematic view showing another application of the drainage medium manufactured by the process of the present invention.

Another application of the drainage pipe 20 according to the present invention is illustrated in FIG. 7. The multi-sectional drainage pipe 20 is utilized by laying the same directly along a riverbank to prevent bank collapse.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A process for manufacturing a porous drainage medium, comprising the steps of:
   a) extruding a molten thermoplastic resin material to form a plurality of strands;
   b) blowing said strands in plasticised condition using a high-velocity fluid to entangle said strands while passing said strands through a forming device, so as to result in a preform consisting of entangled strands;
   c) pinching said preform to form necked-down sections at intervals along the length of said preform, thus providing a plurality of links interconnected by said necked-down sections; and
   d) cooling said preform having said necked-down sections.

2. The process as claimed in claim 1, wherein said preform is tubular.

3. The process as claimed in claim 1, wherein said necked-down sections are formed by a pinch device that includes a pair of die members respectively disposed at two opposite sides of said preform and capable of being moved toward and away from each other.

* * * * *